Aug. 12, 1958  S. W. CLARK  2,847,234
BALL AND SOCKET TRAILER HITCH
Filed Aug. 24, 1953

INVENTOR
S. W. Clark
BY Robert M. Dunning
ATTORNEY

2,847,234
BALL AND SOCKET TRAILER HITCH

Sherman W. Clark, St. Paul, Minn.

Application August 24, 1953, Serial No. 376,112

3 Claims. (Cl. 280—512)

This invention relates to an improvement in a trailer hitch and deals particularly with a detachable connection for use in connecting a trailer to an automobile or the like.

For many years trailer hitches have been produced for connecting automobiles or the like to trailers drawn thereby. One portion of the hitch is usually connected either to the bumper of the automobile or to a portion of the frame, the hitch portion extending rearwardly of the bumper. The other part of the hitch is connected to the tongue of the trailer and this part is detachably connected to the part which is connected to the automobile. In many instances this type of hitch consists in a ball supported on one of the parts of the hitch and a socket connected to the other part of the hitch and incorporates means of normally holding the ball engaged in the socket.

In one common form of hitch of this type the ball is supported rearwardly of the automobile bumper or beneath the bumper. The socket portion includes an elongated body secured to the tongue or draw-bar of the trailer and extending forwardly therefrom. A socket portion usually includes a downwardly directed socket. A forked lever is pivotally connected to the socket portion, one portion of the fork extending on either side of the ball and beneath the same. This fork accordingly holds the ball engaged in the socket, permitting flexibility between the automobile and the trailer without permitting the two parts to become accidentally disengaged.

One of the common difficulties experienced with hitches of this type lies in the fact that when sufficient strain is placed upon the hitch, the tines of the locking lever spread apart sufficiently to permit the ball to become disengaged from the socket. When this occurs, accidental disengagement of the trailer is entirely possible. It will be readily understood that such accidental disengagement of a trailer is a serious menace to life and property, particularly when the vehicles towing the trailers travel at high rates of speed.

An object of the present invention resides in the provision of a trailer hitch of the same general type as has been previously used but forming this hitch so that the tines of the locking lever cannot readily spread apart. The construction is such that the tines are definitely held from spreading apart when in ball engaging position. If the tines should in some way become spread apart while the hitch is in open position, the hitch will not close thereby providing instant notice of the difficulty.

These and other objects and novel features of the present invention will be more clearly and fully set forth in the following specification and claims.

In the drawings forming a part of the specification:

Figure 2:
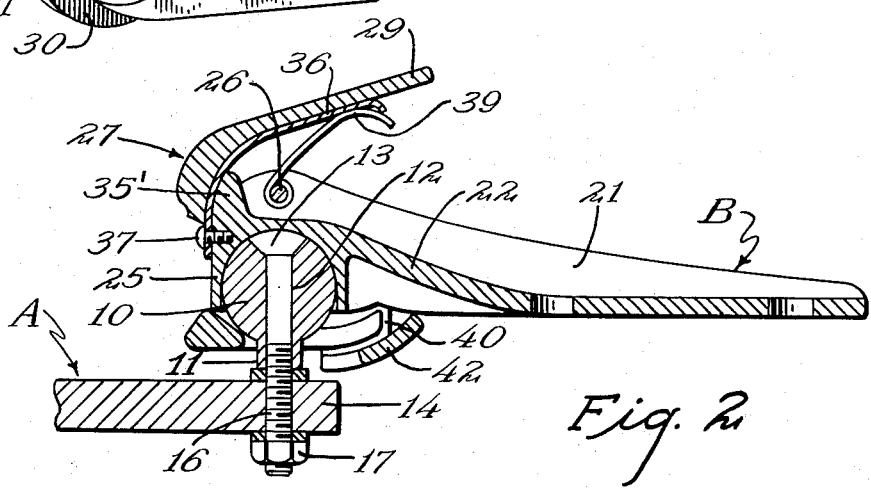
Figure 2 is a sectional view through the hitch showing the relationship of the parts thereof.

The hitch is shown in assembled form in Figure 2 of the drawings, the ball portion A thereof being only shown fragmentarily as the detail of the construction of this part forms no part of the present invention. In the particular arrangement illustrated the portion A of the hitch includes a ball 10 having a neck 11 thereupon. An axial aperture 12 extends through the ball and through the neck 11 to accommodate a pivot bolt 13.

A strap or other member 14 is connected in some way to the car or to the bumper. Normally the strap 14 is more complicated than it appears in Figure 2 but may be merely an elongated strap as illustrated connected to the automobile. The bolt 13 extends through an aperture 16 in the tongue 14 and the ball is connected by a nut 17 to the tongue 14.

The hitch portion includes an elongated strap 19 which is designed for attachment to the upper surface of the tongue or draw-bar of a trailer. Apertures 20 are provided through the tongue to accommodate the attaching bolts which also extend through the tongue. Reinforcing ribs 21 normally extend along opposite sides of the strap 19 and extend upwardly therefrom to reinforce the strap.

Figure 1:
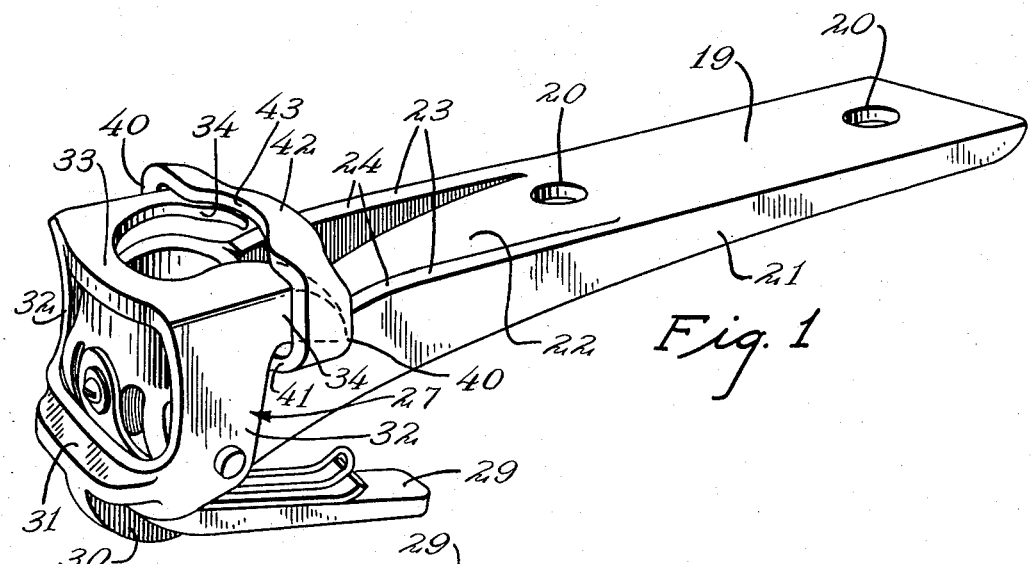
Figure 1 is a bottom perspective view of one portion of a trailer hitch showing the arrangement of parts therein.

As indicated in Figures 1 and 2 of the drawings the strap 19 bends upwardly slightly as indicated at 22, this upwardly inclined portion normally extending beyond the end of trailer tongue. Reinforcing ribs 23 usually have an upper edge 24 extending flush with the upper surface of the strap 19 and are on the plane with the previously described reinforcing ribs 21 which are on the opposite side of the strap. The upperwardly inclined portion 22 then terminates in a downwardly facing socket 25 which is designed to accommodate the ball 10. The upper surface of the socket 25 is preferably semispherical in shape but the walls of the socket extend downwardly so that the socket encloses substantially more than one-half of the ball 16.

A pivot 26 extends transversely through the reinforcing ribs 21 substantially above the center of the socket 25. The ends of this pivot 26 support a locking lever indicated in general by the number 27. This locking lever 27 includes a handle portion 29 which is designed to overlie the end portion of the strap 22 and to incline upwardly and rearwardly from the forward part of the hitch. As shown in Figure 1 the handle portion 29 is provided with a central reinforcing rib 30 extending along the curved portion thereof to reinforce the handle. The lever 27 is then formed to include a transversely extending connecting portion 31 which acts to connect two generally parallel lever sides 32 which are spaced apart a distance sufficient to accommodate the socket portion of the hitch therebetween. The forward portion of the lever between the arms 32 is preferably open to lighten the weight of the structure. The arms 32 are also connected at their lower extremities as indicated by the numeral 33 which shows the transverse connecting member.

The sides 32 merge into a pair of rearwardly extending tines or arms 34 which are spaced apart a distance less than the diameter of the ball 10. These tines or arms 34 are designed to extend beneath the large diameter portion of the ball 10 so as to prevent the ball from passing between the tines. The undersurface of the tines is rounded as indicated at 35, the center of curvature thereof being substantially the axis of the pivot 26. Thus the lever 27 includes at its undersurface a fork designed to engage beneath the ball 10 when this ball is engaged in the socket 25 and to prevent accidental disengagement of the ball from the socket.

A rounded upwardly extending projection 35 is provided upon the socket portion of the device. A spring strip 36 is anchored at 37 to the forward portion of the socket and extends beneath the handle member 29 of the lever 27. A second spring 39 encircles the pivot 26 and also tends to urge the handle lever 29 into closed position. Thus in opening the hitch to release the ball from the socket it is necessary to pivot the handle 29 of the lever, compressing the springs 36 and 39.

Figure 3:
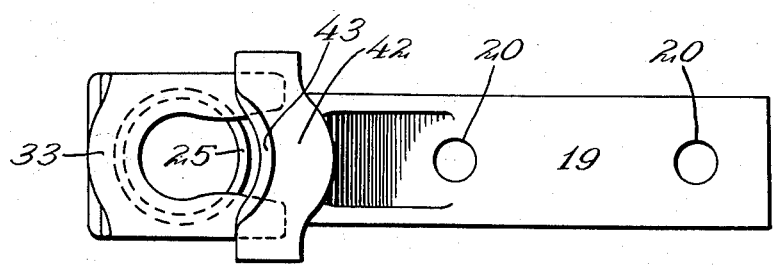
Figure 3 is a bottom plan view of the socket portion of the hitch.

Hitches of this general type have been previously constructed. However, considerable difficulty has been experienced and many accidents have been caused by the tendency of the tines or arms 34 to separate or spread apart so that the ball may be disengaged. In the present construction I provide a loop which includes parallel sides 40 connected by inturned connecting portions 41 to the outer surfaces of the reinforcing ribs 24. As best indicated in Figures 1 and 3 of the drawings these sides 40 are connected by a connecting strap 42. This connecting strap 42 is preferably curved to fit the radius of curvature of the lower surfaces of the tines 34 and the strip is notched as indicated at 43 to permit the ball to pivot freely within the socket. The loop thus formed is integral with the bracket and forms a positive means of preventing the separation of the tines 34 while these tines are in closed position as shown in the drawings. In other words the outer surfaces of the tines are closely adjacent to the sides 40 and these sides prevent the tines from spreading apart more than a predetermined amount.

I have found that my hitch is considerably safer to use than hitches of the previous types employed. Hitches of the type in question are ordinarily made of tough malleable material and the pulling strain of the trailer tongue is transmitted directly to the forward end of the socket 25 and through the ball and bolt 11 to the portion A of the hitch. The ball and bolt are of proper size to draw the weight without bending or shearing. Thus a hitch of the general type disclosed rarely causes difficulty unless the tines which engage beneath the ball spread apart. In other words the spreading of the tines appears to be the major fault with a hitch of this type and it is difficult to make these tines sufficiently strong to prevent any danger of spreading particularly due to the fact that the space is somewhat limited.

Where in the past it has been necessary to examine the hitches at regular intervals to make sure they are in proper order the present hitch eliminates this trouble. The ends of the tines 34 are definitely held from spreading by the enclosing loop into which the ends of the tines extend. If, by some chance, the tines become spread apart while the hitch is in open position, or if the tines gradually spread apart during continued use of the hitch, when the hitch is to be closed the tines will not enter the loop. The operator is then immediately warned that a spreading of the tines is taking place and steps may be taken to correct this difficulty before the tines have spread enough to permit the ball to accidentally be freed from the socket.

In accordance with the patent statutes, I have described the principles of construction and operation of an improvement in a trailer hitch, and while I have endeavored to set forth the best embodiment thereof, I desire to have it understood that obvious changes may be made within the scope of the following claims without departing from the spirit of my invention.

I claim:

1. A trailer hitch including a strap-like member having an elongated attaching portion at one end thereof and having a substantially vertical socket in its under surface at the other end, a ball designed to removably fit into said socket, said ball having a substantially radially extending attachment means projecting therefrom, a lever hingedly connected to said member on a pivot extending transversely of said strap like member and above said socket, said lever having a bifurcated end which extends beneath said socket in one position so as to straddle said attachment means when the ball is positioned in the socket, and means for preventing the spreading of said bifurcated lever end including a loop terminally connected to laterally opposite sides of said strap-like member adjacent to said socket portion, said loop being so arranged that it embraces and abuts the outer surfaces of the ends of the bifurcated portion when the latter is in the position straddling the attachment means.

2. The structure of claim 1 and in which the loop includes a transverse strip, parallel opposed sides connected to opposite ends of said strip, and means connecting said parallel sides to laterally opposite sides of said strap-like member adjacent to said socket portion.

3. The structure of claim 1 and in which the loop includes a transverse strip, parallel opposed sides connected to opposite ends of said strip, and inturned opposed ends connected to said parallel opposed sides and connected to laterally opposite sides of said strap-like member adjacent to said socket portion.

References Cited in the file of this patent

UNITED STATES PATENTS

| 1,794,630 | Linn | Mar. 3, 1931 |
| 2,363,755 | Smith | Nov. 28, 1944 |
| 2,475,780 | Tearnehough | July 12, 1949 |
| 2,515,856 | Brougher | July 18, 1950 |
| 2,520,039 | Kleiman | Aug. 22, 1950 |

FOREIGN PATENTS

| 816,286 | France | Aug. 4, 1937 |
| 1,024,670 | France | Apr. 3, 1953 |
| 624,743 | Germany | Jan. 31, 1936 |